3,338,993
INHIBITION OF COKE PUFFING
Leslie H. Juel, Lewiston, and Robert T. Ellis, Kenmore, N.Y., assignors to Great Lakes Carbon Corporation, New York, N.Y., a corporation of Delaware
No Drawing. Filed July 1, 1964, Ser. No. 379,726
11 Claims. (Cl. 264—29)

This invention relates to a method of improving the graphitization of carbon articles formed from petroleum cokes which are characterized by puffing during graphitization, and more particularly concerns improved methods of inhibiting the puffing of baked carbon articles (formed from such cokes) when they are subsequently graphitized.

It is known that certain impurities in petroleum coke, notably sulfur, nitrogen and oxygen, appear to be associated with if not responsible for the phenomenon known as "puffing." The puffing is manifested by a sudden increase in volume of a petroleum coke particle or article made from such particles when heated through the temperature range of about 1400 to 1800° C. The puffing does not occur during normal calcining or baking operations.

It is desirable to be able to inhibit this puffing with a minimum amount of additive and with a minimum of detrimental effect on graphite properties. Typical of such properties which are important are coefficient of thermal expansion (CTE), resistivity, modulus of rupture (MOR), concentration of ash and/or metal in the final graphitized product, and apparent density (AD).

Heretofore, such puffing difficulties have been obviated by adding such materials as iron oxide, or sodium carbonate (referred to in U.S. Patent 2,814,076), to the materials employed to make the formed carbon article, or to the formed carbon article itself, in order to inhibit volumetric expansion of the shaped carbon article when it is graphitized, or heated to temperatures above about 1400° C.

The use of iron oxide results in the presence of iron as an impurity in the graphitized article; although a moderately high ash content per se may be of little consequence, this iron impurity may specifically be undesirable in certain applications. Thus in order to make graphite articles for such purposes, costly and involved purification steps have had to be taken.

While sodium carbonate overcomes the foregoing disadvantage of using iron oxide, it has been found that when it is used with some "puffing" petroleum cokes, it is sometimes unable to completely eliminate "puffing" in the graphitized articles prepared from said petroleum cokes. Also, because of the oxygen present in this compound and because this compound is a combustion accelerator or ignition agent, which is well known, there is the danger of some "burning" of the formed carbon articles taking place during the baking and/or graphitizing steps. With some petroleum cokes also, the use of sodium carbonate results in an undesirable or substantial decrease in apparent density of the graphitized articles prepared from same as compared to when iron oxide is employed to inhibit the "puffing."

The present invention relates to, or has an object thereof, the discovery of novel agents which may be employed to inhibit the puffing (sudden expansion) of carbon articles formed from petroleum cokes which have puffing characteristics during graphitization, or when heated to temperatures of about 1400 to 1800° C. The invention further relates to novel agents which can accomplish the foregoing and which are also generally capable of bringing this about with little or no adverse effect upon the properties (such as those previously set forth) of the resultant graphitized bodies. The invention also relates to novel agents which can accomplish this without introducing undesirable impurities into or impairing the purity of the graphitized articles. This invention also relates to such novel agents which can accomplish the foregoing more economically (because cheaper) than puffing inhibiting agents previously used in the art. These and other goals or objects of the invention and the achievement thereof will be readily apparent from the findings and examples and data which follow.

It is a finding of this invention that the foregoing objectives may be accomplished by utilizing, as novel puffing inhibiting agents, a fluoride selected from the group consisting of calcium fluoride, magnesium fluoride, strontium fluoride and barium fluoride and mixtures thereof. Of these calcium fluoride is preferred.

It has also been found that minor or small amounts, or proportions by weight of the petroleum coke, of all of these agents, or mixtures thereof, will bring about the desired puffing inhibition.

A series of tests were carried out in order to determine the effectiveness of these materials as puffing inhibiting agents. The tests were carried out by mixing a given selected commercial petroleum coke with coal tar pitch binder, and forming and baking and heat treating the mixture to 2200° C., and determining the amount of puffing or percent volume increase of the product. This established the "control"; after this was established given amounts of the agents to be tested or compared were mixed in with the same amounts of the same commercial petroleum coke and the same amount of the same pitch binder, and the mixtures were then formed and heat treated under identical conditions as the control. The results of these tests are set forth in Table I.

TABLE I

| Coke Type | Inhibitor | Inhibitor Content, Percent | Volume Change, Percent |
|---|---|---|---|
| A | CaF$_2$ | 0 | 1.0 |
|   |   | ¼ | −0.8 |
|   |   | ½ | −1.8 |
| B | CaF$_2$ | 0 | 5.7 |
|   |   | 1 | 0.2 |
|   |   | 1½ | −0.1 |
| A | MgF$_2$ | 0 | 1.1 |
|   |   | ½ | −0.7 |
|   |   | 1 | −1.1 |
| A | BaF$_2$ | 0 | 1.3 |
|   |   | ½ | −1.2 |
|   |   | 1 | −2.2 |
| A | SrF$_2$ | 0 | 1.2 |
|   |   | ½ | −1.2 |
|   |   | 1 | −2.1 |

From the data in Table I, as well as that from other tests carried out by applicants, it was concluded that calcium, magnesium, barium, and strontium fluorides are effective petroleum coke puffing inhibitors.

Bars were formed of a calcined petroleum coke and a coal tar pitch mixture, and then graphitized. Some of the bars contained 1% CaF$_2$ additive to the green mix, the others contained no additive and served as the "control." As the data in Table II shows, the CaF$_2$ not only does not increase ash and Fe content, but actually performs a purifying function.

TABLE II

|  | CaF$_2$ Content | |
|---|---|---|
|  | None | 1% |
| Ash, percent | 0.060 | 0.055 |
| Fe, percent | 0.0033 | 0.0005 |

Further testing by applicants shows that other properties of the graphitized bodies, such as CTE, AD, and resistivity, are not adversely affected by the use of these inhibitors.

Because CaF$_2$ is less expensive and is more effective in eliminating puffing, it is preferred over the other fluoride inhibitors.

The invention is most particularly applicable to inhibiting the puffing of shaped bodies made from calcined coke which has puffing characteristics during graphitization or when heated to temperatures above about 1400° C., and a suitable carbonaceous binder; however, it may also be applied, with some effectiveness or utility, to inhibit the puffing of shaped bodies made from raw petroleum coke which has puffing characteristics. If the bodies are made from puffing raw petroleum coke, they may sometimes also utilize an extraneous carbonaceous binder, while at other times they may utilize a plasticizing agent as per U.S. Patent 2,582,764, or merely heat and pressure and autogeneous bonding as per U.S. Patent 2,502,183 to Swallen. The invention, therefore, is applicable to all petroleum coke bodies, if the said coke particles or articles made from same have puffing characteristics during graphitization. Also, for purposes of this invention, the term "graphitization" is meant to connote the step of heating the shaped bodies to temperatures in excess of about 1400° C., such as to temperatures from 1400° to 3000° C.

By calcined petroleum coke is meant raw petroleum coke which has been devolatilized to a volatile matter content of less than about 1%; whereas the term raw petroleum coke is meant to connote coke of petroleum source which typically possesses a volatile matter content of from about 8 to about 15%.

The invention is also applicable to petroleum coke systems which have undergone pre-processing before the inhibiting agent is added. In other words, raw petroleum coke may be heated and formed as per the Swallen process, and the formed product may then be milled or comminuted, and then mixed with the agent and a binder, and then formed and graphitized. Or, raw petroleum coke may be mixed with a plasticizer, formed and heated, and then the formed body may be comminuted and mixed with the agent and binder, and formed and graphitized. Or calcined petroleum coke may be mixed with a binder, formed and baked, and the baked article comminuted, mixed with the agent and a binder, and formed, baked and graphitized, etc.

Many carbonizable substances are suitable for the bonding function. Conventional coal tar pitches and petroleum asphalts are typical. Alternately, resinous binders such as thermosetting phenol-formaldehyde, phenol-benzaldehyde, furfural, and epoxy resins may be employed. The coking values of these binders vary as do also their viscosities and melting points, etc. However, they are all characterized by the fact that they decompose upon heating, or undergo thermal decomposition, leaving carbon bonds which hold together the finely ground particles of the body materials. From 10 to 40 parts by weight of binder, per 100 parts of petroleum coke, are typically employed.

The invention is particularly applicable to or advantageous with respect to shaped carbonaceous bodies of large dimension (of example, green electrodes 16 inches or 30 inches in diameter and 6 or more feet long, etc.) where a slight percentile of expansion can result in an overall large volume increase with consequent cracking and product loss. However, we do not wish to be bound by size limitations, since the invention can be applied to any sized body where the inhibition or puffing is desirable or necessary.

Because puffing during graphitization frequently leads to cracking and product failure in the production of graphite bodies from a petroleum coke starting material, we typically employ an inhibiting agent to eliminate puffing. The amount of anti-puffing agent required to satisfactorily inhibit this puffing is generally no more than five parts by weight, per hundred parts of petroleum coke, and depends on the degree of puffing exhibited by the coke and its response to the action of the agent. For example, for petroleum cokes which "puff" 4–5 volume percent, no more than from 0.5 to 2.0 parts agent per hundred parts of petroleum coke is required or should be employed. In most cases between about 0.05 and the maximum of about 5.0 parts of agent per hundred parts of petroleum coke is effective in eliminating puffing. However, the use of the foregoing described agents in any amount in order to inhibit "puffing" is considered novel with the present invention and therefore embraced within the broader aspect of same.

It is to be understood that the invention is not limited to the specific examples which have been offered merely as illustrative and that modifications may be made within the scope of the appended claims without departing from the spirit of the invention.

We claim:

1. A method of producing a graphite article from a green carbonaceous shaped body made from petroleum coke which has puffing characteristics during graphitization, and inhibiting the volumetric expansion of said body during graphitization which comprises mixing said petroleum coke with a puffing inhibiting amount of an alkaline earth metal fluoride selected from the group consisting of calcium fluoride, magnesium fluoride, strontium fluoride and barium fluoride, and mixtures thereof, forming the mixture into a green body of the desired shape, and baking and graphitizing said body.

2. A method of producing a graphite article from a green carbonaceous shaped body made from raw petroleum coke which has puffing characteristics during graphitization, and inhibiting the volumetric expansion of said body during graphitization which comprises mixing said petroleum coke with a plasticizing agent and with a puffing inhibiting amount of an alkaline earth metal fluoride selected from the group consisting of calcium fluoride, magnesium fluoride, strontium fluoride and barium fluoride, and mixtures thereof, forming the mixture into a green body of the desired shape, and baking and graphitizing said body.

3. A method of producing a graphite article from a green carbonaceous shaped body made from calcined petroleum coke which has puffing characteristics during graphitization, and inhibiting the volumetric expansion of said body during graphitization which comprises mixing said petroleum coke with a carbonaceous binder and with a puffing inhibiting amount of an alkaline earth metal fluoride selected from the group consisting of calcium fluoride, magnesium fluoride, strontium fluoride and barium fluoride, and mixtures thereof, forming the mixture into a green body of the desired shape, and baking and graphitizing said body.

4. A method of producing a graphite article from a green carbonaceous shaped body made from petroleum coke which has puffing characteristics during graphitization, and inhibiting the volumetric expansion of said body during graphitization which comprises mixing 100 parts of said petroleum coke with from 0.05 to 5 parts, by weight of said coke, of an alkaline earth metal fluoride selected from the group consisting of calcium fluoride, magnesium fluoride, strontium fluoride and barium fluoride, and mixtures thereof, forming the mixture into a green body of the desired shape, and baking and graphitizing said body.

5. A method according to claim 4 wherein from 0.5 to 2.0 parts of fluoride is employed.

6. A method of producing a graphite article from a green carbonaceous shaped body made from calcined petroleum coke which has puffing characteristics during graphitization, and inhibiting the volumetric expansion of said body during graphitization which comprises mixing 100 parts of said petroleum coke with from 10 to 40 parts, by weight of said coke, of carbonaceous binder and with from 0.05 to 5 parts, by weight of said coke, of an alkaline earth metal fluoride selected from the group consisting of calcium fluoride, magnesium fluoride, strontium fluoride and barium fluoride, and mixtures thereof, forming the mixture into a green body of the desired shape, and baking and graphitizing said body.

7. A method according to claim 6 wherein from 0.5 to 2.0 parts of fluoride is employed.

8. A method of producing a graphite article from a green carbonaceous shaped body made from petroleum coke which has puffing characteristics during graphitization, and inhibiting the volumetric expansion of said body during graphitization which comprises mixing said petroleum coke with a puffing inhibiting amount of calcium fluoride, forming the mixture into a green body of the desired shape, and baking and graphitizing said body.

9. A method according to claim 8 wherein the coke is raw petroleum coke and wherein a plasticizing agent is mixed in with the coke and the calcium fluoride.

10. A method of producing a graphite article from a green carbonaceous shaped body made from calcined petroleum coke which has puffing characteristics during graphitization, and inhibiting the volumetric expansion of said body during graphitization which comprises mixing 100 parts of said petroleum coke with from 10 to 40 parts, by weight of said coke, or carbonaceous binder and with from 0.05 to 5 parts, by weight of said coke, of calcium fluoride, forming the mixture into a green body of the desired shape, and baking and graphitizing said body.

11. A method according to claim 10 wherein from 0.5 to 2.0 parts of calcium fluoride is employed.

References Cited

UNITED STATES PATENTS 2,814,076  11/1957  Gartland _____ 264—28

FOREIGN PATENTS 3,060  2/1908  Great Britain.

LEON D. ROSDOL, *Primary Examiner.*

JOHN D. WELSH, *Assistant Examiner.*